United States Patent Office 3,849,525
Patented Nov. 19, 1974

3,849,525
PROCESS OF MANUFACTURING POLYMER
PARTICLES OF IRREGULAR SHAPE
Hendrik Adriaan Jacobus Battaerd, North Clayton, Victoria, Australia, assignor to ICI Australia Limited, and Commonwealth Scientific and Industrial Research Organization, Melbourne, Victoria, Australia
No Drawing. Filed May 22, 1972, Ser. No. 255,796
Claims priority, application Australia, May 31, 1971, PA 5,050/71
Int. Cl. B01j 2/08
U.S. Cl. 264—6
5 Claims

ABSTRACT OF THE DISCLOSURE

A process of manufacturing polymer particles of irregular shape which process comprises firstly subjecting polymer particles in the gel state suspended in a liquid medium to high shear forces while concurrently undergoing further polymerization, secondly completing the polymerization under agglomerating conditions. These irregular shaped particles are of use as filter aids.

---

This invention relates to a novel method of preparing synthetic polymeric particles, in particular it relates to the production of irregularly shaped particles of use as filter aids.

It is known in the art that a filter aid should be substantially non-compressible and should pack together to form a highly porous filter bed. These properties are illustrated by the prior art use of kieselguhr, diatomite, asbestos fibers, pulverised carbon black, calcium carbonate, calcium sulphate, sawdust, flour and diatomaceous earths. Diatomaceous earths have been found to be particularly useful as filter aids but these prior art filter aids suffer from the grave disadvantage that they cannot be reused. In Australian patent application No. 1,083/70 there is described the use of synthetic ferromagnetic polymers as filter aids and these filter aids have the advantage that they can be recovered for re-use by magnetic means.

Known methods of preparing synthetic ferromagnetic polymer particles lead to polymer particles having a relatively smooth surface and being approximately spherical in shape. These particles, although of use as filter aids, suffer from the disadvantage of giving a filter bed of relatively low porosity compared to filter beds of diatomaceous earths.

Methods of producing approximately spherical synthetic particles are well known in the art. In these methods a suspension, of droplets of monomer or low molecular weight liquid polymer, is formed in a suitable liquid medium by vigorous agitation. In general the greater the degree of stirring the smaller is the size of the particles produced. If suitable known stabilisers are added to the suspension the droplets are stable even when the agitation has stopped. The droplets assume an approximately spherical stage due to the force of surface tension and if further polymerisation is allowed to proceed approximately spherical particles are produced.

Methods are also known in the art whereby agglomerates of spherical particles may be prepared. Methods are also known whereby elongated shaped particles may be prepared. Neither of these types of particles have properties which make them suitable as filter aids. We have now found that agglomerates of elongated particles form filter beds having filtration characteristics comparable to filter beds comprising diatomaceous earths and we have also found a new process of making such agglomerated particles of highly irregular shape.

Accordingly, we provide a process of manufacturing polymer particles of irregular shape which process comprises firstly subjecting polymer particles in the gel state suspended in a liquid medium to high shear forces while concurrently undergoing further polymerisation; secondly completing the polymerisation under agglomerting conditions.

Suitable suspensions of polymer particles in the gel state may be made by methods known in the art, for example, suspension polymerisation in the presence of a crosslinking agent, addition and condensation polymerisation, may be employed.

The high shear forces may be produced by any suitable means such as for example vigorous stirring, shaking or spinning. A suitable method of creating the high shear forces is to use, for example, a high speed stirrer to agitate the suspension.

The conditions employed during the polymerisation are critical and the shape and size of the polymer particles produced may be varied by small changes in the rates of stirring and the duration of each stage and in the amount of stabiliser present in the system at each stage.

The degree of irregularity of a sample of polymer particles is difficult to measure quantitatively. A visual rating of the sample may be given as a result of microscopic examination but this rating is tedious to obtain and can be subject to a large personal error.

We have found that particles having similar rates of filtration also have a similar degree of irregularity and therefore a convenient method for assessing the degree of irregularity of a sample of polymer particles is to compare the rate of filtration of a liquid through a bed composed of the particles with the rate of filtration of the same liquid through a series of standard beds of particles of varying degrees of irregularity as assessed by microscopic examination.

Some simple experiments are often needed to find the conditions necessary for obtaining polymer particles for a desired size range and degree of irregularity such that they will form filter beds having the desired filtration characteristics.

If the particles become unstable and agglomerate during the first stage of polymerisation in the presence of high shear forces then the particles produced will have undesirable properties. Therefore the polymer particles must be maintained in a stable form during this first stage. Methods of stabilising such suspensions of particles are well known in the art.

During the first stage of the reaction the particles of polymer in the gel state are deformed under the high shear forces and this deformed configuration is fixed by concurrent polymerisation. When the polymerisation has proceeded to a stage characterised as being the point at which the configuration of the deformed particles is not altered by the force of surface tension in the absence of the high shear forces the first stage of the reaction may be terminated. During the second stage of the reaction the deformed particles are kept in suspension by gentle agitation and agglomeration is allowed to occur. Methods of causing agglomeration are known in the art, for example, by the addition of suitable additives. We prefer however to add only sufficient stabiliser to the first stage of the reaction to stabilise the first stage so that during the second stage the particles will become unstable and agglomerate spontaneously.

We have found in a preferred embodiment of our invention that the amount of polymerisation required during the first stage of the process to produce deformed particles of fixed configuration can be reduced if the suspension of gel particles in the liquid medium is made thixotropic.

The suspension may be made thixotropic by the addition of certain known fillers such as, for example, bentonites in aqueous systems or bentones in organic media. We have found that the addition of a high loading of certain ferromagnetic particles such as gamma iron oxide to the suspension of gel particles in liquid medium leads to a thixotropic mixture.

Thus the process of our invention is of especial use in the manufacture of synthetic ferromagnetic polymer particles for use as filter aids.

Suspensions of polymer particles, comprising polymer in the gel state and gamma iron oxide, are of particular use in our process when the ratio of the weight of polymer to weight of gamma iron oxide in the particles is in the range from 7:3 to 1:9. The amount of gamma iron oxide selected in that range is not critical and the choice depends upon the magnetic properties required for the ferromagnetic polymeric particles.

Methods have been described in Australian patent applications Nos. 46,964/68, 64,565/69 and 65,645/69 for the manufacture of retiporous and vesicular polymeric particles and in a preferred embodiment of our invention these and other known methods are modified to produce highly irregular retiporous or vesicular particles.

By suitable control of the rate of stirring and of the amount of stabiliser present at each stage of the polymerisation particles having any desired degree of porosity and any desired degree of irregularity may be produced.

These examples have been designed to illustrate the balance which exists between the two stages of our process to produce a particle consisting of an agglomeration of elongated particles suitable for use as a filter aid. A suitable balance is demonstrated in experiments 6, 7 and 9 of Example 1, and in Examples 3, 6 and 9. All parts are parts by weight.

EXAMPLE 1

A series of experiments were performed to demonstrate the effect of changing the polymerisation conditions on particle size and irregularity in an addition polymerisation reaction. The following general method was used. A polyester solution was preformed from a mixture of fumaric acid (3 moles), phthalic anhydride (1 mole) and propylene glycol (4 moles) and the solution was characterised as having an acid value of 38 and a Gardner Holt body Z2 of 70% w./w. in styrene. A water phase was prepared by mixing "Gelvatol" 20/90 (Trademark for a polyvinyl alcohol solution) (8 parts) and hydroxyethylcellulose (2 parts) with water (1000 parts).

"Bayer" S11 gamma iron oxide (Trademark for an iron oxide) was dispersed in a mixture of the polyester solution (223 parts), styrene (amount as shown in Table 1) and benzoyl peroxide (55% w./w. in dibutyl phthalate:75 parts) using a high speed stirrer. This dispersion was added to a mixture of a portion of the water phase (500 parts), ammonia (0.880 s.g.:6.25 parts) and diethylene triamine (0.85 parts) with vigorous stirring using a fluted stirrer. Water (833 parts) was added maintaining vigorous stirring to convert the water in oil emulsion into an oil in water emulsion. The reaction mixture was flushed with nitrogen and then heated to 90° C. for 2 hours under gentle stirring to allow the polymerisation to be completed. The amounts of gamma iron oxide and styrene used for each experiment were as shown in Table 1. Table 1 also includes a visual description of the particles produced.

TABLE 1

| Experiment | Percent w./w. iron oxide in the particles | "Bayer S11" gamma iron oxide parts | Styrene parts | Visual description |
|---|---|---|---|---|
| 1 | 1 | 3.15 | 89 | Unagglomerated spherical beads, light grey color of average size 20 microns. |
| 2 | 10 | 34.7 | 89 | Unagglomerated spherical beads of average size 20 microns, grey color. |
| 3 | 30 | 134 | 89 | Unagglomerated slightly elongated beads of average size 30 microns, dark grey color. |
| 4 | 32.5 | 150 | 89 | Do. |
| 5 | 35 | 168 | 89 | Unagglomerated 80 percent slightly elongated average size 80 microns, 20 percent highly elongated average size 3-100 microns. |
| 6 | 40 | 208 | 89 | Some agglomeration. Beads highly elongated; particles of average size size 3-200 microns. |
| 7 | 40 | 168 | 29 | Agglomerates formed from highly elongated beads of average size 30-100 microns. |
| 8 | 32 | 134 | 60 | Unagglomerated, 50 percent elongated, bead size 3-100 microns; 50 percent near spherical, bead size 40 microns. |
| 9 | 34 | 134 | 29 | Highly agglomerated, beads highly elongated of average size 3-100 microns. |

In Experiments 1 to 6 the gamma iron oxide content was gradually increased. The mixtures in Experiments 1 to 3 were not thixotropic. When the percentage of gamma iron oxide increased above 32.0 w./w. the mixture became thixotropic and irregular particles were produced. The degree of agglomeration of the particles was altered by changing the ratio of polyester to styrene.

EXAMPLE 2

The degree of irregularity of the particles prepared in Experiments 1 to 9 of Example 1 were compared using as criterion of degree of irregularity the rate of flow through a filter bed. The filter beds were prepared by the following general method. 3 g. of polymer particles were suspended in 100 mls. of water and poured into a 1" glass funnel (porosity 2) fitted with a close fitting "Whatman" M–511 (Trademark) filter paper. The rate of flow of water through the filter beds under a constant head of 7" was measured. The results obtained for the particles obtained in Experiments 1 to 9 of Example 1 are shown in Table 2.

TABLE 2

| Particles prepared in experiment number | Flow rate, ml./min. |
|---|---|
| 1 | 10 |
| 2 | 10 |
| 3 | 10 |
| 4 | 10 |
| 5 | 13 |
| 6 | 20 |
| 7 | 33 |
| 8 | 19 |
| 9 | 31 |

EXAMPLE 3

"Black Iron Oxide" 318M (Trademark for an iron oxide) (61 parts) was dispersed in a mixture of 72.5 parts of the polyester solution prepared in Example 1, styrene (55.5 parts) and cumene hydroperoxide (3 parts) using a high speed stirrer. This dispersion was added to a mixture of "Gelvatol" 20/90 (30 parts), hydroxycellulose (1.0 part), 0.880 s.g. ammonia (0.5 part), diethylene triamine (0.57 part) and water (228 parts) with vigorous stirring using a fluted stirrer.

The resultant mixture was warmed to 60° C. for 10 minutes. This suspension was treated with 750 parts of water with vigorous stirring. The reaction mixture was then flushed with nitrogen and heated to 90° C. for 2 hours with gentle stirring to allow the polymerisation to be completed. The particles produced were found on visual examination to consist of agglomerates of elongated beads. The average size of the particles was in the range 10 to 50 microns. The filtration rate through a bed of the particles was measured by the method of Example 2 and was found to be 37 mls./min.

The experiment was repeated without heating the mixture to 60° C. for 10 minutes. The suspension of particles was not in the gel state during the addition of the 750 parts of water. The particles produced were found on visual examination to consist of agglomerates of approximately spherical beads having an average size of 15 microns. The filtration rate through a bed of the particles was measured by the method of Example 2 and was found to be 7 mls./min.

EXAMPLE 4

"Black Iron oxide" 318M (326 parts) was dispersed in "Mouldrite" A256 urea formaldehyde syrup (Trademark) (32.6 parts). This dispersion was then dispersed in ortho-dichlorobenzene (1300 parts) with vigorous stirring producing a suspension of small droplets of the urea formaldehyde syrup. These droplets were stabilised by the addition of 32 parts of "Span" 85 (Trademark for a polyoxyethylene sorbitan monooleate). The dispersion was acidified at ambient temperature under gentle agitation and allowed to stand for 10 hours.

Particles of average size 100 microns were obtained consisting of agglomerations of approximately spherical beads of average size 50 microns.

EXAMPLE 5

The experiment of Example 4 was repeated with the addition of 16.5 parts of "Teric" PE 68 (Trademark for a polyalkylate condensate) as a dispersing agent to the urea formaldehyde syrup. The particles obtained were mainly unagglomerated spherical beads having an average size of 50 microns.

EXAMPLE 6

The experiment of Example 4 was repeated except that the dispersion of droplets was stirred vigorously during the acidification. During acidification the temperature rose from 20° C. to 40° C. due to heat generated by the stirrer. The mixture was stirred gently for 10 hours. The particles obtained were of average size 50 microns and consisted of agglomerations of elongated beads of average size 10–15 microns.

EXAMPLE 7

The experiment of Example 5 was repeated except that the dispersion of droplets was stirred vigorously during the acidification. During acidification the temperature rose from 20° C. to 35° C. due to the heat generated by the stirrer. The mixture was stirred gently for 10 hours. The particles obtained were a mixture comprising mainly unagglomerated elongated beads of average size less than 50 microns, and a small proportion of particles consisting of agglomerated beads.

The experiment was repeated twice using 65 parts and 95 parts of "Span" 85, respectively. The proportion of agglomerated beads dropped as the amount of stabiliser was increased. The shape of the beads was not changed.

EXAMPLE 8

The experiment of Example 7 was repeated using 65 parts of "Span" 85 except that the rate of stirring during acidification was lowered. As the rate of stirring decreased the size of beads produced increased. Very little agglomeration occurred and the beads remained elongated.

EXAMPLE 9

A dispersion was prepared by mixing together water (134 parts), "Teric" PE–68 (2.8 parts), "Gelvatol" 20/30 (19.62 parts), "Gamma iron oxide" 511 (5.6 parts) and glutaraldehyde 25% w./w. (49.3 parts) until all the iron oxide agglomerates were broken up. This dispersion was added to an oil phase consisting of monochlorobenzene (117 parts), ortho-dichlorobenzene (423 parts) and "Span" 85 (13.8 parts). This mixture was stirred vigorously until the required particle size was achieved.

This suspension of particles was stirred vigorously with 1 N HCl (13 parts). The polymer was cured by stirring gently for 10 hours. The particles obtained were of average size 100 microns and consisted of agglomerated elongated beads of average size 15 microns. The flow rate using the particles was 33 ml./min. measured by the method of Example 2.

EXAMPLE 10

The experiment of Example 9 was repeated except that the suspension of particles was stirred gently while 1 N HCl (13 parts) was added. The stirring was continued for 10 hours to allow polymerization to be completed. The particles obtained were of average size 70 microns and consisted of agglomerated approximately spherical beads of average size less than 15 microns. The flow rate measured by the method of Example 2 was 10 ml./min.

EXAMPLE 11

The experiment of Example 9 was repeated except that 540 parts of monochlorobenzene were used and the ortho-dichlorobenzene was omitted. No agglomeration occurred and the particles obtained were elongated beads of average size 45 microns.

The flow rate measured by the method of Example 2 was 21 mls./min.

EXAMPLE 12

The experiment of Example 11 was repeated except that the acid was added with gentle stirring. The particles obtained were approximately spherical non-agglomerated beads of average size 30 microns. The flow rate measured by the method of Example 2 was 7 mls./min.

I claim:

1. In a process of manufacturing agglomerates of polymer particles by suspension polymerisation of droplets of a monomer suspended in a liquid medium comprising:
    (a) partially polymerising droplets of a monomer mixture suspended in a liquid medium mixed with a suspension stabilizer so that the droplets pass from an initial liquid state to a gel state;
    (b) completing said polymerisation under agglomerating conditions, to produce agglomerates of polymer particles
the improvement comprising:
    (c) subjecting the suspension of partially polymerised droplets mixed with a suspension stabilizer, to shear forces sufficiently high to overcome the forces of surface tension of the droplets and to cause the droplets to become elongated particles,
    (d) continuing the polymerisation while concurrently subjecting the particles to said shear forces until the viscosity of the particles is sufficiently raised for the resulting configuration of elongated particles to be unaltered in the absence of shear forces, whereby polymer particles of elongated shape are formed,
    (e) keeping the elongated particles in suspension by gentle agitation and allowing agglomeration of the particles to occur.

2. A process according to claim 1 wherein a stabilizer is added in Step (a) in an amount sufficient to stabilize the suspension from Step (a) through Step (d) so that during Step (e) the particles become unstable and agglomerate spontaneously 3. A process according to claim 1 wherein the suspension of droplets in the liquid medium is thixotropic.

4. A process according to claim 3 wherein the suspension has been made thixotropic by the addition of ferromagnetic particles.

5. A process according to claim 4 for the manufacture of synthetic ferromagnetic polymeric particles suitable for use as filter aids wherein the ratio of the weight of polymer to weight of gamma iron oxide in the particles is in the range from 7:3 to 1:9.

References Cited

UNITED STATES PATENTS

| 3,591,671 | 7/1971 | Burt et al. | 264—117 |
| 3,586,654 | 6/1971 | Lerman et al. | 264—9 |

ROBERT F. WHITE, Primary Examiner

J. R. HALL, Assistant Examiner

U.S. Cl. X.R.

264—117